United States Patent [19]

Knierim

[11] Patent Number: 5,235,413
[45] Date of Patent: Aug. 10, 1993

[54] METHOD AND APPARATUS FOR PROCESSING COMPONENT SIGNALS TO PRESERVE HIGH FREQUENCY INTENSITY INFORMATION

[75] Inventor: David L. Knierim, Wilsonville, Oreg.

[73] Assignee: Tektronix, Inc., Wilsonville, Oreg.

[21] Appl. No.: 736,657

[22] Filed: Jul. 26, 1991

[51] Int. Cl.$^5$ ............................................. H04N 9/68
[52] U.S. Cl. ........................................ 358/37; 358/30; 358/32
[58] Field of Search ............... 358/37, 30, 32, 164, 358/166, 162

[56] References Cited

U.S. PATENT DOCUMENTS

| | | | |
|---|---|---|---|
| 4,355,326 | 10/1982 | Lee | 358/37 |
| 4,721,998 | 1/1988 | Glenn | 358/30 |
| 4,812,905 | 3/1989 | Rossi | 358/32 |
| 4,999,702 | 3/1991 | Knierim et al. | 358/32 |

FOREIGN PATENT DOCUMENTS 0234592 9/1990 Japan.
0017486 1/1992 Japan.

OTHER PUBLICATIONS

Eto et al. "Digital Processing Amplifier and Color Encoder", SMPTE Journal, vol. 87, pp. 15–19, Jan. 1978.

Primary Examiner—James J. Groody
Assistant Examiner—David E. Harvey
Attorney, Agent, or Firm—John Smith-Hill

[57] ABSTRACT

A video signal in component form is processed by generating high frequency linear color component signals from wideband linear color component input signals. The high frequency linear color component signals are combined to produce a high frequency linear luminance component signal, which is combined with color component signals that contain low frequency components present in the wideband linear color component input signals to produce high-frequency-corrected linear color component signals.

20 Claims, 3 Drawing Sheets

METHOD AND APPARATUS FOR PROCESSING COMPONENT SIGNALS TO PRESERVE HIGH FREQUENCY INTENSITY INFORMATION

BACKGROUND OF THE INVENTION

This invention relates to a method and apparatus for processing component signals to preserve high frequency intensity information.

FIG. 1 shows a conventional color video camera 2 and a conventional color cathode ray tube (CRT) display device 6. Camera 2 includes three linear sensors 4R, 4G and 4B, which generate respective color component signals R', G' and B'. The voltages of these three signals are proportional to the intensity of red, green and blue light respectively in the camera's focal plane. However, the intensity of light emitted by the screen of a conventional CRT is not linearly related to the voltage of the video signal that is applied to the electron gun of the CRT. In the case of a color CRT, the intensity of light emitted by the CRT is given by $$E = .299*(R**GAMMA) \\
+ .587*(G**GAMMA) \\
+ .114*(B**GAMMA)$$

Eq. 1 where R, G and B are the driving voltages applied to the red, green and blue electron guns respectively, ** is the exponentiation operator and GAMMA is a constant (2.2 in the case of the NTSC system).

Because of this relationship between electron gun driving voltage and emitted light intensity, the video camera shown in FIG. 1 incorporates GAMMA correction circuits 5R, 5G and 5B, so that the red component signal R outputted by the camera is proportional to R'**(1/GAMMA), and similarly for G and B. The R, G and B color component signals provided by the camera may be used, with suitable amplification, to drive the CRT 7 directly, as shown in dashed lines, and the intensity of red, green and blue light emitted by the CRT would be proportional to R', G' and B' respectively. However, most color television standards, such as NTSC, PAL and RP125, encode visual information as luminance (Y), where $$Y = 0.299*R + 0.587*G + 0.114*B$$

Eq. 2 and chrominance, or chroma (CR and CB). In the NTSC system, CR is equal to R−Y and CB is equal to B−Y. Therefore, video camera 2 includes a resistive encoding matrix 8 that converts the R, G and B component signals to luminance and chroma component signals and the display device 6 includes a decoding matrix 9 that receives the Y, CR and CB signals and reconstructs the R, G and B component signals therefrom.

The NTSC standard prescribes a bandwidth of 4.2 MHz for the Y component signal and a bandwidth of up to 1.2 MHz for the chroma component signals. This difference in bandwidth reflects the fact that the human eye is more sensitive to high frequency changes in intensity than to high frequency changes in brightness. In order to be able to generate a luminance component signal that fully utilizes the available bandwidth of the NTSC system, the primary color component signals must have a bandwidth of at least 4.2 MHz. Before combining the luminance and chrominance component signals to form a composite NTSC signal, the luminance component signal is limited in bandwidth to 4.2 MHz by a filter 10 and the chroma component signals are limited in bandwidth to 1.2 MHz by filters 11.

If R, G and B each range in value from 0 to 1, and R, G and B are each equal to 1, so that white light is emitted, Y is equal to 1 and the emitted light intensity E is equal to 1. However, because the emitted light intensity is a non-linear function of R, G and B, the luminance component, Y, is not sufficient to describe the intensity of the light emitted by the CRT. Thus, the intensity E is a function of Y, CR and CB and a given Y value will result in a higher intensity E when combined with large chroma values (large absolute values for CR and/or CB) than when combined with small chroma values. For example, a saturated full brightness red (R = 1, G = 0 and B = 0) has a Y value of 0.299 and provides an intensity value E of 0.299, whereas a gray for which R = 0.299, G = 0.299 and B = 0.299 also provides a Y value of 0.299 but results in an intensity E of 0.299**GAMMA, or 0.070 for GAMMA = 2.2.

The non-linearity of the relationship between emitted intensity and R, G and B, and the consequence that E is a function of CR and CB as well as of Y, gives rise to a problem when the chroma component signals are filtered to a lower bandwidth than the luminance component signal, such as when preparing to combine the signals to produce an NTSC composite signal.

If color component signals R, G and B are used to drive a high resolution CRT display, and the value of R within a selected area of the field is 1 and elsewhere it is 0 and the values of G and B are 0 throughout the field, so that the CRT displays an area of saturated red against a black background, the peak value of Y is 0.299 and the peak value of E is 0.299. If these color component signals are converted to the NTSC standard, and the area of the field that is red is a vertical line that is at least as wide as allowed by the bandwidth of the chroma channels, the values of Y and E within the area of the red line are the same as in the case of the high resolution display. The peak values of R−Y and B−Y are 0.701 and −0.299 respectively. If, however, the line displayed on the high resolution CRT display was as narrow as allowed by the luminance channel bandwidth, the chroma filters employed in converting the color component signals to the NTSC standard would spread out the chroma signals by a factor of three or so, and reduce the peak values of the chroma signals by the same factor. Accordingly, while the peak value of Y is still 0.299, the peak values of R−Y and B−Y are 0.234 and −0.100 respectively, and the peak value of E is 0.095, or only about one-third of the intensity value for the wider line. This problem of reduced intensity is not limited to the case in which the signals are filtered in the horizontal direction, and arises also with vertical filtering, for example when component signals for driving a high resolution display, which may have more than a thousand lines per frame, are converted to a broadcast television standard having only about 500 or 600 lines per frame. In the case of the PAL system, in which GAMMA is equal to 2.8, the problem is even more severe.

As typified by FIG. 1, it is conventional to limit the bandwidth of the luminance and chroma component signals by low-pass filtering these signals. This necessarily implies that the low-pass filtering operation takes place after the GAMMA correction has been effected. With most natural images, where saturation and contrast are low, this provides a satisfactory display. However, in the case of an image that contains fine detail (high spatial frequencies) of saturated color against a dark background, such as can be generated by a computer graphics system, the low-pass filtering in the GAMMA-corrected domain causes a reduction in the brightness of the displayed image.

U.S. Pat. No. 4,999,702 issued Mar. 12, 1991 to the assignee of this application shows that high frequency intensity information in GAMMA-corrected color component signals may be preserved when encoding these signals into chroma and luminance component signals by generating a linear luminance component signal and GAMMA-corrected chroma component signals and generating a GAMMA-corrected luminance component signal that is a function of the linear luminance component signal and the GAMMA-corrected chroma component signals.

In U.S. Pat. No. 4,999,702, a look-up table and interpolator are used for generating the GAMMA-corrected luminance component signal. The look-up table must be recalculated for each different value of GAMMA, and this can be a time consuming process. Further, the method and apparatus disclosed in U.S. Pat. No. 4,999,702 result in a loss of saturation for colored details displayed against a dark background.

SUMMARY OF THE INVENTION

In accordance with a first aspect of the invention, a method of processing a video signal in component form comprises receiving wideband linear color component input signals and generating high frequency linear color component signals from the wideband linear color component input signals. The high frequency linear color component signals are combined to produce a high frequency correction signal, which is combined with color component signals that contain low frequency components present in the wideband linear color component input signals to produce high-frequency-corrected linear color component signals.

In accordance with a second aspect of the invention, apparatus for processing a video signal in component form comprises input means for receiving wideband linear color component input signals and frequency separation means for generating high frequency linear color component signals from the wideband linear color component input signals. Matrix means combine the high frequency linear color component signals to produce a high frequency correction signal, and combiner means combine the high frequency correction signal with color component signals that contain low frequency components present in the wideband linear color component input signals to produce high-frequency-corrected linear color component signals.

BRIEF DESCRIPTION OF THE DRAWINGS

For a better understanding of the invention, and to show how the same may be carried into effect, reference will now be made, by way of example, to the accompanying drawings.

DETAILED DESCRIPTION

Figure 2:
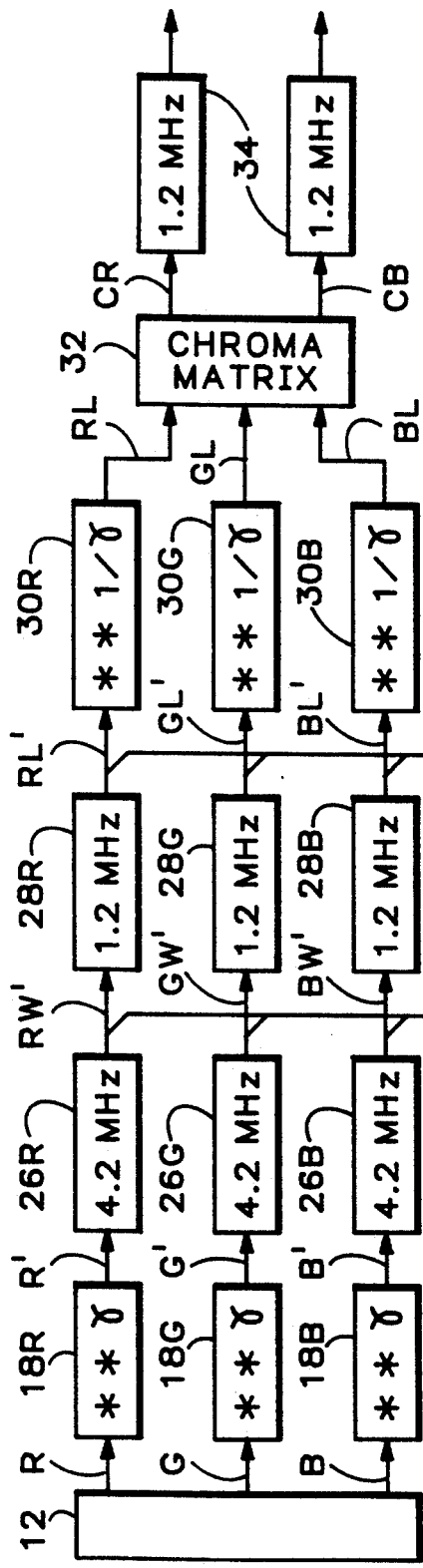
FIG. 2 is a block diagram of apparatus embodying the invention, the apparatus having a chroma processing channel and a luminance processing channel.
Figure 2:
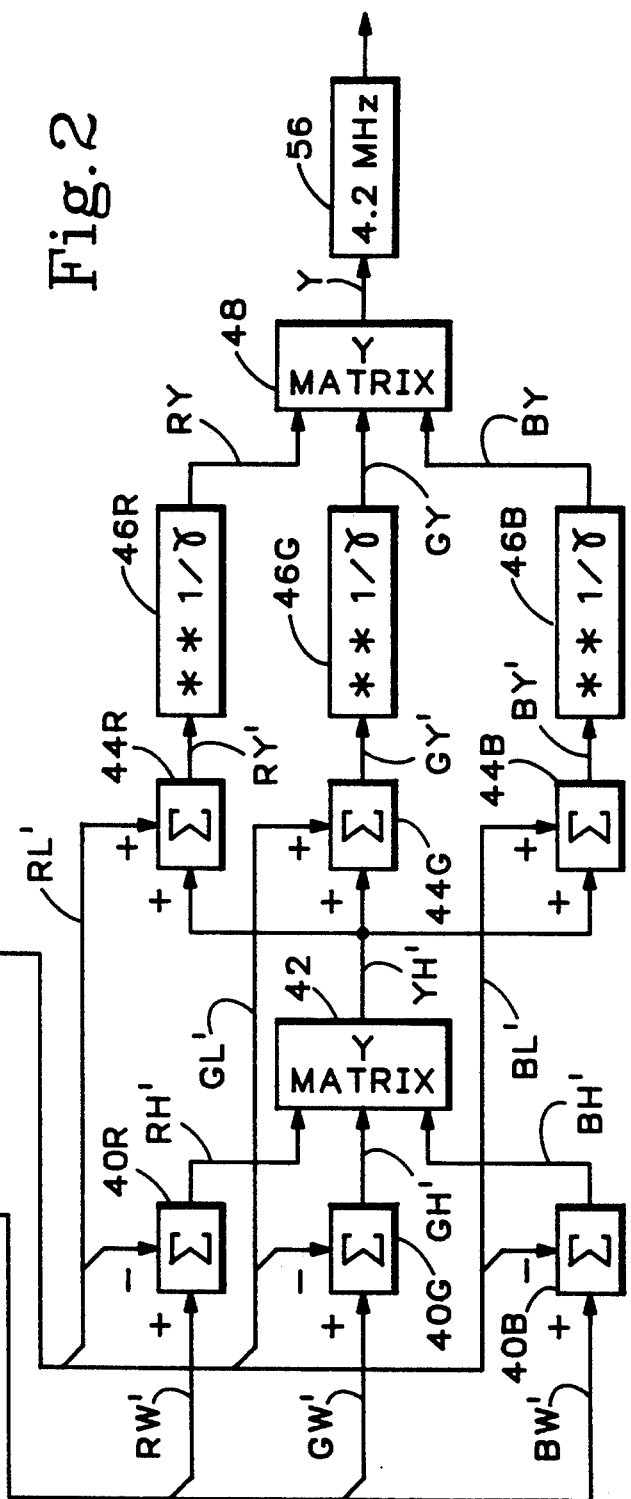
Figure 3A:
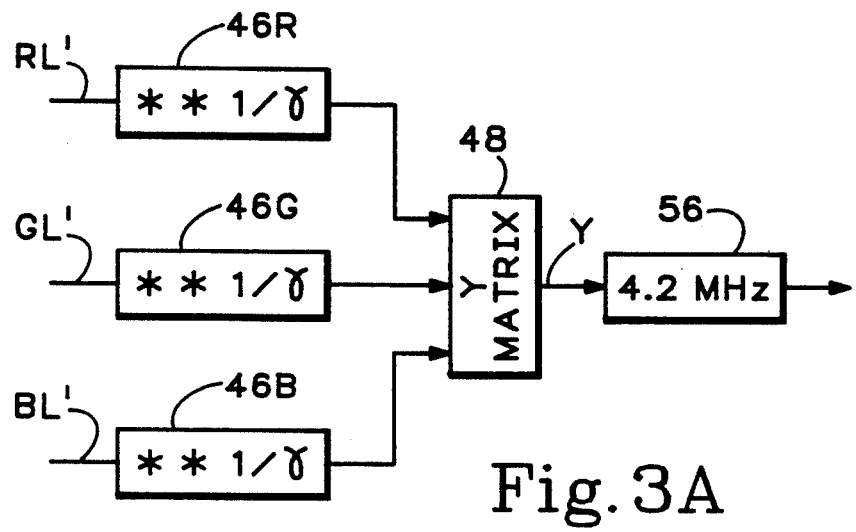
FIG. 3A is a block diagram illustrating low frequency operation of the luminance processing channel of the apparatus shown in FIG. 2.
Figure 3B:
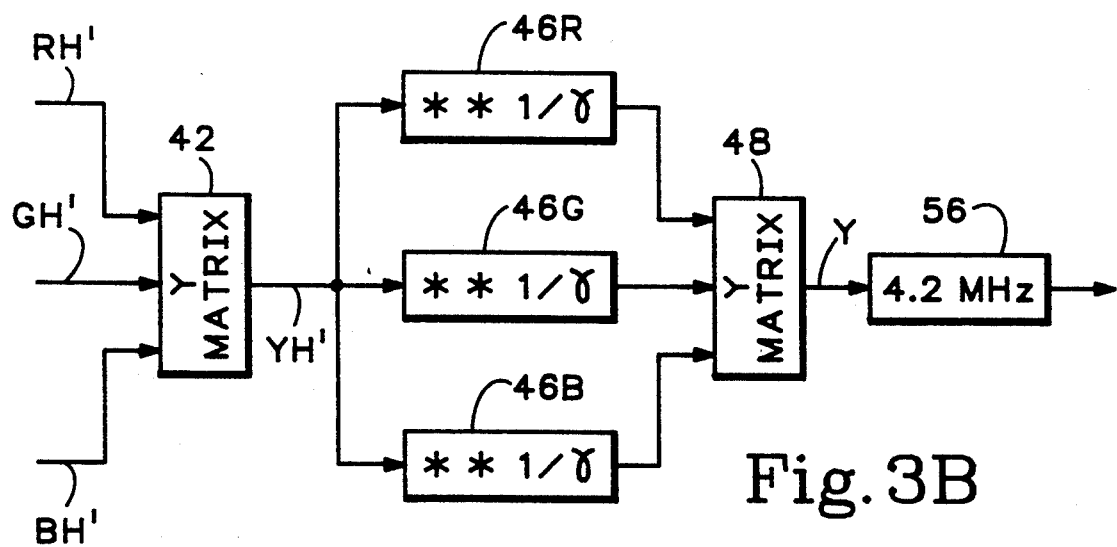
FIG. 3B is a block diagram illustrating high frequency operation of the luminance processing channel of the apparatus shown in FIG. 2.

The apparatus shown in FIG. 2 comprises a source 12 of GAMMA-corrected color component signals R, G and B. The color component signals are digital signals in 10-bit parallel form and are all of the same bandwidth, which, in this example, is at least 4.2 MHz. Source 12 might be, for example, a video camera or a high resolution color graphics system that provides color component signals.

The GAMMA-corrected color component signals R, G and B are applied to GAMMA-removal circuits 18R, 18G and 18B respectively. Circuit 18R provides an output signal R' which is equal to R**2.2, and circuits 18G and 18B operate in similar fashion on the signals G and B to provide output signals G' and B'. Thus, GAMMA-removal circuits 18 remove the GAMMA corrections from the color component signals R, G and B and provide uncorrected, or linear, color component signals R', G' and B' respectively. If the GAMMA-corrected output signals have a bandwidth substantially greater than 4.2 MHz, the linear signals R', G' and B' are applied to low-pass filters 26 having a cutoff frequency of 4.2 MHz to provide wideband linear signals Rw', Gw', Bw'.

The wideband linear color component signals Rw', Gw', Bw' are applied to low-pass filters 28R, 28G, 28B respectively, each having a cutoff frequency of 1.2 MHz, to provide low-pass filtered linear color component signals Rl', Gl', Bl', which are applied to GAMMA correctors 30R, 30G, 30B respectively. The GAMMA correctors 30 provide low frequency GAMMA-corrected color component signals Rl, Gl, Bl, which are applied to a chroma matrix 32. Chroma matrix 32 outputs chroma component signals CR and CB. By limiting the bandwidth of the chroma component signals in the linear domain, the visual artifacts associated with low-pass filtering in the GAMMA-corrected domain are avoided.

The low-pass filtered linear color component signals Rl', Gl', Bl' are applied to the subtrahend inputs of subtractors 40R, 40G, 40B, which receive the wideband linear color component signals Rw', Gw, Bw' at their addend inputs. Thus, the outputs of the subtractors 40 are high-pass filtered linear color component signals Rh', Gh', Bh', which are applied to a luminance matrix 42. The resulting high frequency linear luminance signal Yh' is applied to one input of each of three adders 44R, 44G and 44B. The adders 44 receive the low-pass filtered linear color component signals Rl', Gl', Bl' at their other inputs, and provide high-frequency-corrected (HF-corrected) linear color component signals Ry', Gy', By' at their outputs. The HF-corrected linear color component signals Ry', Gy', By' are applied to GAMMA correctors 46R, 46G, 46B, which output luma and GAMMA-corrected color component signals Ry, Gy, By to a second luminance matrix 48. The luminance matrix 48 outputs a luminance signal Y.

If applied directly to a high resolution monitor, the color component signals R, G. B provided by source 12 would generate a display whose brightness Es is given by Es=0.299*(R**GAMMA)+0.587*(G**GAMMA)
+0.114*(B**GAMMA)

or $$E_s = 0.299*R' + 0.587*G' + 0.114*B'$$

For low frequency signals, i.e. signals of frequency below 1.2 MHz, the low-pass filtered linear color component signals Rl', Gl', Bl' are approximately equal to R', G', B' respectively and the high-pass filtered linear color component signals Rh', Gh', Bh' are very small. The high frequency linear luminance component signal Yh' is very small and therefore, the HF-corrected linear color component signals Ry', Gy', By' are approximately equal to the low-pass filtered linear color component signals Rl', Gl', Bl', or R', G', B'. Therefore, both the GAMMA-corrected color component signals Rl, Gl, Bl and the luma and GAMMA-corrected color component signals Ry, Gy, By are approximately equal to R, G, B and the GAMMA-corrected luminance signal is then approximately equal to $$0.299*R + 0.587*G + 0.114*B$$

Figure 1:
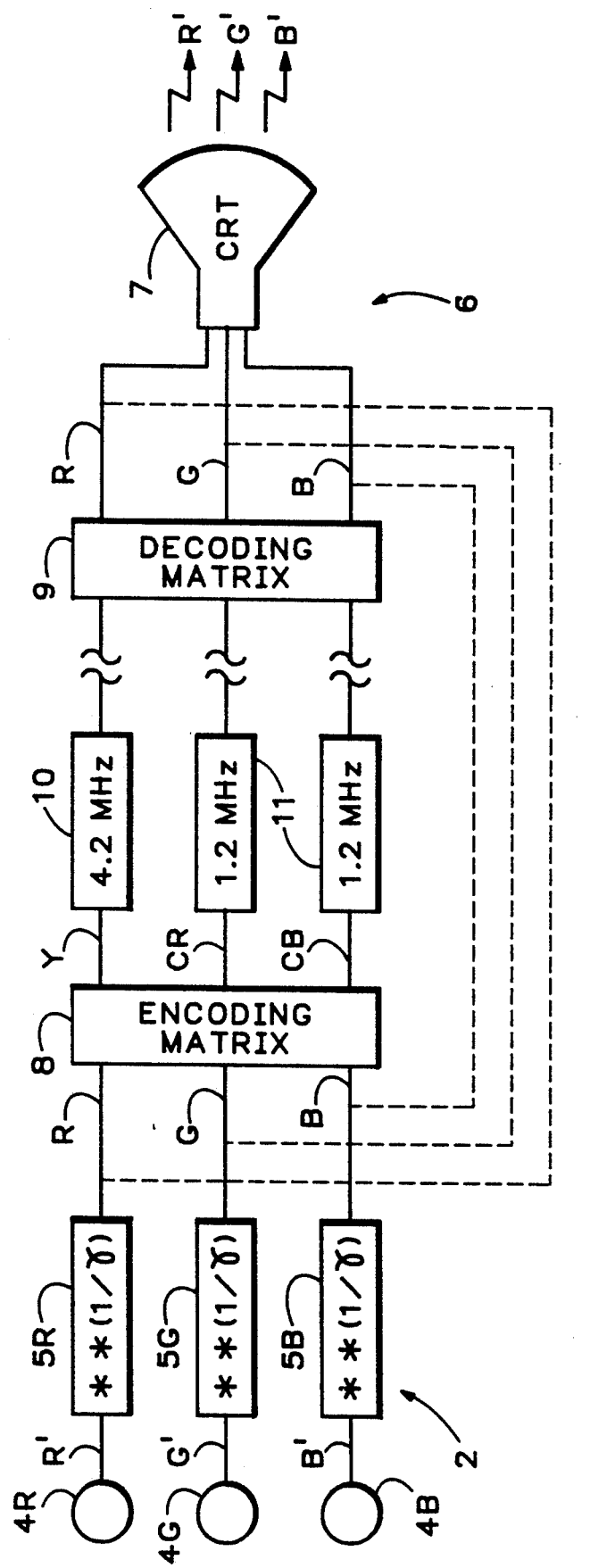
FIG. 1 is a block diagram of a conventional arrangement of a video camera and display device.

Therefore, for low frequency signals the circuit shown in FIG. 2 behaves in much the same way as the camera 2 shown in FIG. 1.

For high frequency signals, i.e. signals of frequency in the region from 1.2 MHz to 4.2 MHz, Rh' is approximately equal to R', Gh' is approximately equal to G', and Bh' is approximately equal to B'. For this case, the signal brightness Es is approximately $0.299*Rh' + 0.587*Gh' + 0.114*Bh'$. This is exactly the function performed by matrix 42, and so the signal brightness Es is approximately equal to Yh'. For these high frequency signals, Rl', Gl', and Bl' are small compared to Yh'. Thus Ry', Gy', and By' are each approximately equal to Yh', which is in turn approximately equal to the signal brightness Es. The luminance matrices 46 and 48 then generate the GAMMA-corrected luminance component signal Y as:

$$\begin{aligned}Y &= .299*(Ry'^{**}(1/GAMMA)) \\ &+ .587*(Gy'^{**}(1/GAMMA)) \\ &+ .114*(By'^{**}(1/GAMMA)) \\ &\approx .299*(Es^{**}(1/GAMMA)) \\ &+ .587*(Es^{**}(1/GAMMA)) \\ &+ .114*(Es^{}(1/GAMMA)) \\ &= Es^{}(1/GAMMA)\end{aligned}$$

It follows from Equations 1 and 2 that $$\begin{aligned}E &= .299*((CR + Y)^{**}GAMMA) \\ &+ .587*((Y - .509CR - .194CB)^{**}GAMMA) \\ &+ .114*((CB + Y)^{**}GAMMA)\end{aligned} \qquad \text{Eq. 3}$$

For high frequency signals CR and CB are very small compared to Y, so Equation 3 becomes:

$$\begin{aligned}E &= .299*(Y^{**}GAMMA) \\ &+ .587*(Y^{**}GAMMA) \\ &+ .114*(Y^{}GAMMA) \\ &= Y^{}GAMMA\end{aligned}$$

From above, Y is approximately $Es^{}(1/GAMMA)$, so E is approximately $(Es^{}(1/GAMMA))^{**}GAMMA = Es$. Thus the displayed brightness E is approximately equal to the signal brightness Es, which is the desired result. Therefore, by combining the high frequency color component signals in the linear domain to form a high frequency linear luminance component signal, the proper screen brightness of high frequency color information is maintained.

For saturated details against a black background, the apparatus shown in FIG. 2 provides an increased value of Y as compared to a conventional encoding matrix and this results in the correct screen intensity.

High frequency luminance information may be preserved simply by high-pass filtering the wideband linear color component signals Rw', Gw', Bw' to provide the inputs to matrix 42, instead of low-pass filtering the wideband signals and subtracting the low frequency color component signals Rl', Gl', Bl' from the wideband signals. However, this would result in undesirable loss of saturation, since the luminance component signal Y would be too large, unless separate means were provided for low-pass filtering the wideband linear color component signals before adding them to the output of matrix 42. As suggested above, low-pass filtering the color component signals in the linear domain provides the added advantage of improving saturation for saturated details against black.

True GAMMA correction of an arbitrary signal X involves raising X to the power 1/GAMMA. The function $X^{**}(1/GAMMA)$ is not defined for negative values of X whereas the GAMMA correctors 46 shown in FIG. 2 must occasionally receive negative inputs. In general, this requirement may be accommodated by extrapolating the function to negative values of X. However, the GAMMA correction function has an infinite slope at X=0, and therefore extrapolation does not accommodate negative inputs. In order to alleviate these problems, the function that is applied in the GAMMA correction is an approximation to the true GAMMA correction function. The GAMMA correctors 46 return the greater of 8 * X and −1 for values of X less than or equal to zero and return the lesser of 8 * X and $X^{**}(1/GAMMA)$ for values of X greater than zero. To preserve proper colors, the GAMMA correctors 30 must implement the same function as the GAMMA correctors 46 and the GAMMA-removal circuits 18 must implement the inverse of that function.

The particular GAMMA correction function that is selected is not critical, so long as it approximates $X^{**}(1/GAMMA)$ and is able to accept negative inputs. For example, the input can be clipped at zero, preventing negative outputs, without seriously degrading the final result.

The GAMMA correctors 30 may generate harmonics of the linear low frequency color component signals at their outputs, and therefore the output signals of matrix 32 are applied to 1.2 MHz low-pass filters 34 to remove these harmonics. Similarly, the output signal of matrix 48 is applied to a 4.2 MHz low-pass filter 50 to remove harmonics of the HF-corrected signals present at the outputs of GAMMA correctors 46. The digital output signals of filters 34 and 56 may then be converted to analog form and, assuming appropriate line and field rates, used to generate a composite NTSC signal.

It will be appreciated that the invention is not restricted to the particular embodiments that have been described, and that variations may be made therein without departing from the scope of the invention as defined in the appended claims and equivalents thereof. For example, the GAMMA-removal circuits 18 are not required if the signals received at the input are in linear form. Moreover, the low-pass filters 26 are needed only if the bandwidth of the linear signals is substantially greater than 4.2 MHz. The invention may be implemented with analog signals instead of the digital signals described above. Although the foregoing description has been confined to a one-dimensional (horizontal) filtering operation, the principles of the invention are also applicable to vertical filtering to preserve high frequency intensity information with respect to vertical detail.

I claim:

1. A method of processing a video signal in component form, comprising:
   (a) receiving wideband linear color component input signals,
   (b) generating high frequency linear color component signals from the wideband linear color component input signals,
   (c) combining the high frequency linear color component signals to produce a high frequency linear luminance component signal, and
   (d) combining the high frequency linear luminance component signal with color component signals that contain low frequency components present in the wideband linear color component input signals to produce high-frequency-corrected linear color component signals.

2. A method according to claim 1, wherein step (a) comprises receiving color component signals in GAMMA-corrected form and removing the GAMMA correction of the GAMMA-corrected color component signals to provide linear color component signals.

3. A method according to claim 1, wherein step (a) comprises receiving linear color component signals of bandwidth greater than a selected value, and low-pass filtering said linear color component signals to provide said wideband linear color component input signals.

4. A method according to claim 1, wherein step (b) comprises generating a low frequency linear color component signal and a high frequency linear color component signal from each of the wideband linear color component input signals, the frequency range of the low frequency linear color component signals being substantially complementary to that of the high frequency linear color component signals.

5. A method according to claim 4, wherein step (b) comprises low-pass filtering each of the wideband linear color component input signals to produce the low frequency linear color component signals, and subtracting the low frequency linear color component signals from the wideband linear color component input signals to produce the high frequency color component signals.

6. A method according to claim 4, wherein step (d) comprises combining the high frequency linear luminance component signal with each of the low frequency linear color component signals to produce the high-frequency-corrected color component signals.

7. A method according to claim 6, comprising adding the high frequency linear luminance component signal to each of the low frequency linear color component signals to produce the high-frequency-corrected linear color component signals.

8. A method according to claim 6, further comprising:
   (e) GAMMA correcting the high-frequency-corrected color component signals to produce GAMMA and HF-corrected color component signals, and
   (f) combining the GAMMA and HF-corrected color component signals to produce a GAMMA-corrected luminance signal.

9. A method according to claim 4, further comprising employing the low frequency linear color component signals to produce two GAMMA-corrected chroma component signals.

10. A method according to claim 4, further comprising GAMMA correcting the low frequency linear color component signals and combining the GAMMA-corrected low frequency color component signals to produce two chroma component signals.

11. A method according to claim 1, wherein step (c) comprises forming a weighted average of the high frequency linear color component signals.

12. A method according to claim 1, further comprising:
   (e) GAMMA correcting the high-frequency-corrected linear color component signals to produce GAMMA and HF-corrected color component signals, and
   (f) combining the GAMMA and HF-corrected color component signals to produce a GAMMA-corrected luminance signal.

13. A method according to claim 12, further comprising low-pass filtering the GAMMA-corrected luminance signal.

14. A method according to claim 1, comprising GAMMA correcting the linear color component signals and combining the GAMMA-corrected color component signals to produce two chroma component signals.

15. A method according to claim 14, further comprising low-pass filtering the chroma component signals.

16. Apparatus for processing a video signal in component form, comprising:
   input means for receiving wideband linear color component input signals,
   frequency separation means for generating high frequency linear color component signals from the wideband linear color component input signals,
   matrix means for combining the high frequency linear color component signals to produce a high frequency linear luminance component signal, and
   combiner means for combining the high frequency linear luminance component signal with color component signals that contain low frequency components present in the wideband linear color component input signals to produce high-frequency-corrected linear color component signals.

17. Apparatus according to claim 16, wherein the frequency separation means comprise a low-pass filter for receiving the wideband linear color component input signals and producing low frequency linear color component signals, and means for subtracting the low frequency linear color component signals from the wideband linear color component input signals to produce the high frequency linear color component signals.

18. Apparatus according to claim 17, wherein the combiner means comprise means for combining the high frequency linear luminance component signal with each of the low frequency linear color component signals to produce the high-frequency-corrected color component signals, 19. Apparatus according to claim 18, wherein the means for combining the high frequency linear luminance component signal with the low frequency linear color component signals comprise addition means for adding the high frequency linear luminance component signal to each of the low frequency linear color component signals.

20. Apparatus according to claim 16, further comprising:
   means for GAMMA correcting the high-frequency-corrected color component signals to produce GAMMA and HF-corrected color component signals, and
   means for combining the GAMMA and HF-corrected color component signals to produce a GAMMA-corrected luminance component signal.

* * * * *